United States Patent [19]

Suzuki

[11] Patent Number: 5,139,821
[45] Date of Patent: Aug. 18, 1992

[54] POWDER COATING RESIN COMPOSITION

[75] Inventor: Hajime Suzuki, Hyogo, Japan

[73] Assignee: Daicel-Hüls Ltd., Tokyo, Japan

[21] Appl. No.: 563,790

[22] Filed: Aug. 6, 1990

Related U.S. Application Data

[62] Division of Ser. No. 419,645, Oct. 11, 1989, abandoned.

[30] Foreign Application Priority Data

Oct. 18, 1988 [JP] Japan .................................. 63-262130

[51] Int. Cl.$^5$ .......................... B05D 3/02; B05D 3/08; B05D 3/10
[52] U.S. Cl. ...................................... 427/195; 525/432
[58] Field of Search ........................ 427/195; 525/432

[56] References Cited

U.S. PATENT DOCUMENTS 3,683,047  8/1972  Honda et al. ...................... 525/432
4,075,369  2/1978  Ferraro et al. ................. 427/195 X
4,172,161 10/1979  Feldmann et al. .................. 427/195

FOREIGN PATENT DOCUMENTS 44-28318 11/1969  Japan ................................... 525/432

Primary Examiner—Michael Lusignan
Attorney, Agent, or Firm—Flynn, Thiel, Boutell & Tanis

[57] ABSTRACT

A polyamide resin composition is used in powder coating and comprises a first polyamide having a carboxylic acid at 70 percent or above of the terminal groups thereof and a second polyamide having an amine at 70 percent or above of the terminal groups thereof.

7 Claims, No Drawings

POWDER COATING RESIN COMPOSITION

This application is a division of U.S. Ser. No. 07/419,645, filed Oct. 11, 1989, now abandoned.

The present invention relates to a powder coating resin composition. In particular, the present invention relates to a powder coating polyamide resin composition capable of forming a coating film having an ample thickness on the corners of an article to be coated.

Prior Art

Polyamide powders are used for powder coating, such as fluidized bed coating, called here fluidization dip coating, and electrostatic coating, and are good in view of properties of friction and abrasion, strength and heat resistance.

Although the polyamide can be easily treated, since the properties of the powder thereof before the coating are essentially the same as those of the coating film formed by coating, irrespective of the coating conditions, because it is a thermoplastic resin, it has a defect that its fluid state is retained, even after a smooth surface is formed by melt fluidization of the resin in the powder coating step, since no viscosity increase due to crosslinking or the like occurs and that, as a result, the coating film at the corners of the coated articles becomes too thin and the corners are often exposed above the coating surface. This causes rusting or the polyamide coating films peel off during the use of the coated articles.

A method for overcoming this defect comprises polymerizing a polyamide in the absence of any polymerization regulator to form a polyamide having a giant amino acid structure with a carboxyl group at one end of the polyamide molecule and an amino group at the other end thereof, adding a polymerization catalyst thereto and pulverizing the mixture to form a powdery product. When this product is used for the powder coating, the polymerization of the molten powder further proceeds in the coating step to increase its viscosity and, therefore, the reduction in the thickness of the coating film at the corners can be prevented. Although this method is acceptable, it is difficult according to this method to stably form a polyamide which has a relatively low viscosity and is usable for powder coating without using any polymerization regulator. Since the equilibrium of the condensation reaction of a carboxylic acid with an amine to form an amido bond and water is preponderantly in favor of the formation of an amide, the polyamide can be easily condensed by heating but the control of the condensation is difficult. In other words, unless the polymerization at both ends is inhibited to some extent by modifying the ends with a polymerization regulator, such as a mono- or dicarboxylic acid or a mono- or diamine, the polymerization proceeds to extremes to finally form an insoluble and infusible ultra-high-molecular polyamide.

Therefore, when no polymerization regulator is added, the degree of polymerization must be adjusted by keeping the heating time constant. However, in practice, the residence time in the polymerizer is not constant. In addition, when the polymer is taken out of the polymerization system, the residence time in the initial stage is much different from that in the last stage. Another defect is that an ultra-high-molecular polyamide is formed by the polyamides residence on the walls of the polymerizer or the like to give rise to nibs on the surface of the coating film.

SUMMARY OF THE INVENTION

An object of the present invention is to easily and stably provide a polyamide powder capable of condensing in its molten state in a powder coating step and capable of covering corners.

The present invention provides a powder coating polyamide resin composition comprising a polyamide in which at least 70% of the terminal groups are carboxyl groups and a polyamide in which at least 70% of the terminal groups are amino groups.

A polyamide resin composition of the invention is suitable for powder coating and comprises a first polyamide having a carboxylic acid content of 70 percent or above at the terminal groups thereof and a second polyamide having an amine content of 70 percent or above at the terminal groups thereof.

It is preferred that the composition has a relative viscosity of 1.10 to 1.30 in its 0.5% m-cresol solution and a total equivalent of carboxylic acids to a total equivalent of amines ranges from 40:60 to 60:40 in the first and second polyamides.

Using the composition of the invention, a polymer powder can be obtained for powder coating. For example, a powder is produced by separately melting two or more of oligomers and monomers which are reactive with each other, spraying a mixture of the oligomers and the monomers, while continuously mixing them with each other, the mixture being solid at a normal temperature, having a melt viscosity of 1,000 cps or below at 300 degree C., then cooling the sprayed mixture to obtain a powder thereof, and solid phase-polymerizing it to obtain the polymer powder. In this method, the composition of the invention is used for the mixture.

The invention provides a powder for powder coating comprising a product of the solid phase polymerization of the composition and then a powder for powder coating comprising the polyamide resin composition and a catalyst for polymerization.

The invention further provides a polymer powder as obtained by the process as defined above. Moreover the invention provides a method for powder coating an article by using the polymer powder.

The polyamides herein include polymers and oligomers which have amide bonds in their main chains and which can be used for the powder coating. Examples of them include nylon 12, nylon 11, nylon 612 and copolymers of them with another monomeric polyamide.

The polyamide in which at least 70% of the terminal groups are carboxyl groups (hereinafter referred to as carboxylic polyamide) and the polyamide in which at least 70% of the terminal groups are amino groups (hereinafter referred to as amino polyamide) can be easily and stably obtained by polymerization conducted in the presence of a theoretical amount of a dicarboxylic acid and diamine, respectively, as the polymerization regulator. In this process, the formation of the ultra-high-molecular compound becomes impossible, since the amount of the amine or carboxylic acid necessitated for forming the amide becomes insufficient.

When the diamine or dicarboxylic acid is used as the polymerization regulator, a polyamide having an amino or carboxyl group at each of its ends is formed. However, a polyamide in which less than 70% of the terminal groups are amino or carboxyl groups, namely a polyamide in which at least 30% of the terminal groups are carboxyl or amino groups, has an equivalent ratio of the amino group to the carboxyl group in the range of 70:30 to 30:70 and, therefore, it polymerizes itself to make the intended stable polymerization with impossible. If such a polyamide could be stably obtained, it might be one which could cover corners of an article and the technique in which two inactive polyamides are mixed together as in the present invention would be unnecessary. Since, however, the easy and stable production of such a product is difficult, the object of the present invention cannot be attained by this process.

On the other hand, when a monoamine or mono-carboxylic acid is used as the polymerization regulator, part of the terminal groups of the resultant polyamide are unreacted and, therefore, even when a polyamide in which less than 70% of the terminal groups are amino group is mixed with a polyamide in which less than 70% of the terminal groups are carboxyl groups, the increase in the degree of polymerization is only slight and the object of the present invention cannot be attained.

The dicarboxylic acids usable in the present invention include adipic, dodecanedioic and terephthalic acids and the diamines include hexamethylenediamine and isophoronediamine.

Desirably at least 90% of the terminal groups of the carboxylic polyamide are carboxyl groups and at least 90% of the terminal groups of the amino polyamide are amino groups. Although the carboxylic polyamide and the amino polyamides per se are stable polyamides when they are kept separately, they turn into polymerizable polyamides when they are mixed together, thus exhibiting the effect of the present invention. The mixing ratio of the carboxylic polyamide to the amino polyamide is such that the ratio of the total carboxylic acid equivalent to the total amine equivalent in the polyamide mixture is in the range of 40:60 to 60:40. In such a case, the polymerization proceeds most advantageously in the coating step.

The carboxylic polyamide and the amino polyamide can be mixed together in the form of melts or solutions thereof. The melt mixing is conducted in a short time in which the polymerization hardly proceeds. When the melt mixing is conducted in the absence of any polymerization catalyst and a polymerization catalyst is added to a powdery product after the completion of the mixing, the intended powder coating polyamide resin composition of the present invention can be obtained more stably.

Further the powder coating polyamide resin composition of the present invention can be obtained also by mixing a finely pulverized carboxylic polyamide with a finely pulverized amino polyamide.

Additives such as a pigment and stabilizer can be added to the carboxylic polyamide or amino polyamide or the mixture of them.

In an advantageous embodiment of the process of the present invention, the carboxylic polyamide and the amino polyamide ar formed by the polymerization conducted in the presence of the dicarboxylic acid and diamine as the polymerization regulator in such amounts that a 0.5% solution of the resultant polyamide in m-cresol will have a relative viscosity of 1.10 to 1.30, and then they are mixed together in the form of melts or solutions of them together with, if necessary, a pigment, stabilizer, etc. to from a brittle, polymerizable polyamide oligomer. This product can be easily pulverized to form a powder. A polymerization catalyst is added to the powder, if necessary, and the solid phase polymerization is conducted to form a powdery product having a desired molecular weight. The pulverization is quite easy in this process, though a freeze pulverization with liquid nitrogen is necessitated for high-molecular polyamides usually used for powder coating because they are tough and cannot be easily pulverized.

The powdery polyamide resin composition of the present invention can be easily and stably produced, since stable carboxylic polyamide and amino polyamide are previously formed by the polymerization and they are mixed together to form an active, polymerizable polyamide. This product is capable of sufficiently coating the corners of articles to be powder-coated.

In one embodiment of the present invention, a carboxylic polyamide having a low degree of polymerization is mixed with an amino polyamide having a low degree of polymerization and the mixture is pulverized and subjected to solid phase polymerization to easily obtain the intended powder without necessitating liquid nitrogen for the pulverization.

EXAMPLES

The following Examples will further illustrate the present invention.

EXAMPLE 1

5 kg of laurolactam, 290 g of dodecanedioic acid and 200 g of water were placed in a 10-l autoclave. The inside of the autoclave was purged with nitrogen and the temperature was elevated to 280° C. to elevate the pressure in the autoclave to 25 kg/cm$^2$. After keeping the temperature at 280° C. for 7 h, the temperature was lowered to 250° C. while the vapor pressure in the autoclave was gradually reduced to atmospheric pressure over 1 h. The reaction mixture was stirred at 250° C. for 3 h while nitrogen was blown into the autoclave and then the polymer was discharged into water under nitrogen pressure over 1 h, assuming a large-scale apparatus, to form a carboxylic polyamide in the form of a white mass.

The mass could be easily pulverized and the infrared absorption spectrum thereof coincided with that of nylon 12. It had a melting point of 177° C.. The relative viscosity of a 0.5% solution of the polymer obtained in the initial stage of the discharge through the bottom of the autoclave in m-cresol was 1.17. According to titration with a benzyl alcohol solution, the terminal groups had a carboxylic acid equivalent of 493 meg/kg and an amine equivalent of 12 meq/kg. A 0.5% solution of the polymer obtained in the final stage (one hour after the initiation of the discharge) in m-cresol had the same relative viscosity of 1.17 as that in the initial stage, suggesting that the polymer was stably formed.

The same procedure as that described above was repeated except that 147 g of hexamethylenediamine in place of 290 g of dodecanedioic acid was placed in a 10-l autoclave to form an amino polyamide in the form of a faintly yellowish white mass.

The mass was brittle and could be easily pulverized and the infrared absorption spectrum thereof coincided with that of nylon 12. It had a melting point of 177° C. The relative viscosity of a 0.5% solution of the polymer in m-cresol wa 1.19. The terminal groups had a carboxylic acid equivalent of 14 meq/kg and an amine equivalent of 453 meq/kg.

50 parts by weight of the carboxylic polyamide thus obtained, 50 parts by weight of the amino polyamide thus obtained, 5 parts by weight of titanium oxide and 1.0 part by weight of Irganox 1010 (a product of Ciba-Geigy) were mixed together. The mixture was extruded with a double-screw extruder having a diameter of 30 mm at 200° C. and cooled with water to form a white mass. A 0.5% solution of the mass in m-cresol had a relative viscosity of 1.20.

The product was pulverized with a small pulverizer (Sample Mill of Hosokawa Micron Co.) at ambient temperature to easily obtain a powder, which was sieved with a 60-mesh sieve. About 90% of the powder passed through this sieve. 100 parts by weight of the powder thus passed through the sieve was mixed with 20 parts by weight of a 1% solution of phosphoric acid as the polymerization catalyst in methanol. The mixture was left to stand at 60° C. for 5 h and solid phase polymerization was conducted at 150° C. for 20 h in a nitrogen stream.

A 0.5% solution of the obtained powder in m-cresol had a relative viscosity of 1.61. An iron plate having right-angled corners and a thickness of 3 mm was coated with the powder by the fluidization dip coating method. The iron plate was preheated at 350° C. for 7 min, immersed for 5 sec, left to stand for 1 min and cooled with water. No corners of the iron plate were exposed. A 0.5% solution of the coating film in m-cresol had a relative viscosity of 1.95.

Separately, 100 parts by weight of nylon 12 having a relative viscosity of 1.62 and which had been produced by using dodecanedioic acid as the polymerization regulator, 5 parts by weight of titanium oxide and 1 part by weight of a stabilizer were extruded in the same manner as that described above and the product was pulverized together with liquid nitrogen with the same pulverizer as that described above. The resultant powder had a viscosity of 1.61. The powder was sieved through a 60-mesh sieve to pass about 10% thereof. When an iron plate having a thickness of 3 mm was coated with the powder thus passed through the 60-mesh sieve by the fluidization dip coating method, the corners of the iron plate were partially exposed. The coating film had a relative viscosity of 1.61.

EXAMPLE 2

The polymerization was conducted by using dodecanedioic acid or hexamethylenediamine as the polymerization regulator and 0.2% of phosphoric acid in an ordinary method. Nylon 12 pellets having a relative viscosity (in the form of a 0.5% solution in m-cresol) of 1.61, a carboxylic acid equivalent of 98 meq/kg and an amine equivalent of 20 meq/kg were mixed with nylon 12 pellets having a relative viscosity (in the form of a 0.5% solution in m-cresol) of 1.59 carboxylic acid equivalent of 21 meq/kg and amine equivalent of 115 meq/kg in equal amounts. The mixture was pulverized together with liquid nitrogen to form a 200-mesh pass powder.

An iron plate having a thickness of 1 mm was electroplated with the powder, heated at 240° C. for 6 min and cooled with water. A 0.5% solution of the coating film in m-cresol had a relative viscosity of 1.75.

EXAMPLE 3

500 g of 11-aminoundecanoic acid, 4 g of adipic acid and 1 g of phosphoric acid were placed in a vessel. The mixture was heated at 210° C. in a nitrogen stream for 1 h and then at 250° C. for 3 h to form a carboxylic polyamide. The infrared absorption spectrum of the product coincided with that of nylon 11. It had a melting point of 185° C. and a 0.5% solution thereof in m-cresol had a relative viscosity of 1.50. It had a carboxylic acid equivalent of 115 meq/kg and an amine equivalent of 18 meq/kg.

An amino polyamide was prepared from 500 g of 11-aminoundecanoic acid, 3.5 g of hexamethylenediamine and 1 g of phosphoric acid in the same manner as described above. The infrared absorption spectrum of the product coincided with that of nylon 11. It had a melting point of 185° C. and a 0.5% solution thereof in m-cresol had a relative viscosity of 1.48. It had a carboxylic acid equivalent of 21 meq/kg and an amine equivalent of 135 meq/kg.

The carboxylic polyamide was mixed with the amino polyamide in equal amounts and the mixture was kneaded and extruded with a 20 mm diameter extruder to form pellets. A 0.5% solution of the pellets in m-cresol had a relative viscosity of 1.59.

The pellets were pulverized together with liquid nitrogen with a small pulverizer. Those which did not pass through a 60-mesh sieve were repeatedly pulverized to obtain about 300 g of the powder passing through the 60-mesh sieve. An iron plate having a thickness of 3 mm was coated with the natural powder thus formed by the fluidization dip coating method. The iron plate was preheated at 350° C. for 7 min, immersed for 5 sec, left to stand for 1 min and cooled with water. No corners of the iron plate were exposed. A 0.5% solution of the coating film in m-cresol had a relative viscosity of 1.99.

Comparative Example 1

5 kg of laurolactam and 200 g of water were placed in a 10-l autoclave. The inside of the autoclave was purged with nitrogen. When the temperature was elevated to 280° C., the pressure in the autoclave reached 25 kg/cm$^2$. After keeping the temperature at 280° C. for 7 h, the temperature was lowered to 250° C. while the vapor pressure in the autoclave was gradually reduced to atmospheric pressure over 1 h. Then the polymer was slowly discharged through the bottom under nitrogen pressure over 1 h, assuming a large-scale apparatus. A 0.5% solution of the polymer, obtained in the initial stage of the discharge through the bottom, in m-cresol had a relative viscosity of 1.58. The terminal groups of the product had a carboxylic acid equivalent of 61 meq/kg and an amine equivalent of 64 meq/kg. A 0.5% solution of the polymer obtained in the final stage (one hour after the initiation of the discharge) in m-cresol had a relative viscosity of 1.75. This fact suggests that the polymerization proceeded in the course of the discharge to make the formation of the polymer having the intended viscosity difficult.

What is claimed is:

1. A method of powder coating an article comprising the steps of:
    providing a first polyamide in which at least 70% of its terminal groups are carboxyl groups;
    providing a second polyamide in which at least 70% of its terminal groups are amino groups;
    mixing the first polyamide and the second polyamide and forming a powder comprising the first and second polyamides;
    polymerizing the first polyamide with the second polyamide and forming a powder coating polyamide resin composition; and
    coating an article with the powder coating polyamide resin composition.

2. The method of powder coating of claim 1, wherein a pigment is mixed with the first polyamide and the second polyamide.

3. The method of powder coating of claim 1, wherein a polymerization catalyst is added to the powder comprising the first and second polyamides.

4. The method as claimed in claim 1, in which a total equivalent of carboxylic acids to a total equivalent of amines ranges from 40:60 to 60:40 in the first and second polyamides.

5. The method of powder coating of claim 1, wherein a 0.5% solution of the polyamide resin composition in m-cresol has a relative viscosity of from 1.10 to 1.30.

6. The method of powder coating of claim 1, wherein said article has at least one corner.

7. The method of powder coating of claim 1, wherein at least 90% of the terminal groups of the first polyamide are carboxyl groups and 90% of the terminal groups of the second polyamide are amino groups.

* * * * *

UNITED STATES PATENT AND TRADEMARK OFFICE
CERTIFICATE OF CORRECTION

PATENT NO. : 5,139,821
DATED : August 18, 1992
INVENTOR(S) : Hajime SUZUKI et al It is certified that error appears in the above-identified patent and that said Letters Patent is hereby corrected as shown below:

On the title page, item [75], please change to read as follows:

---Hajime Suzuki, Hyogo, Japan, and Heinz Scholten, Haltern, Germany---.

Signed and Sealed this

First Day of March, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,139,821
DATED : August 18, 1992
INVENTOR(S) : Hajime Suzuki, et. al.

It is certified that error appears in the above-indentified patent and that said Letters Patent is hereby corrected as shown below:

On the Title page, item [73], Assignee: should read--Daicel Huls Co., Tokyo, and Huls Aktiengesellschaft, D-4370 Marl, Germany--.

Signed and Sealed this

Twenty-sixth Day of April, 1994

*Attest:*

BRUCE LEHMAN

*Attesting Officer*     Commissioner of Patents and Trademarks